No. 864,845.　　　　　　　　　　　　PATENTED SEPT. 3, 1907.
C. A. JANSON.
VARIABLE SPEED TRANSMISSION MECHANISM.
APPLICATION FILED NOV. 23, 1906.
3 SHEETS—SHEET 1.
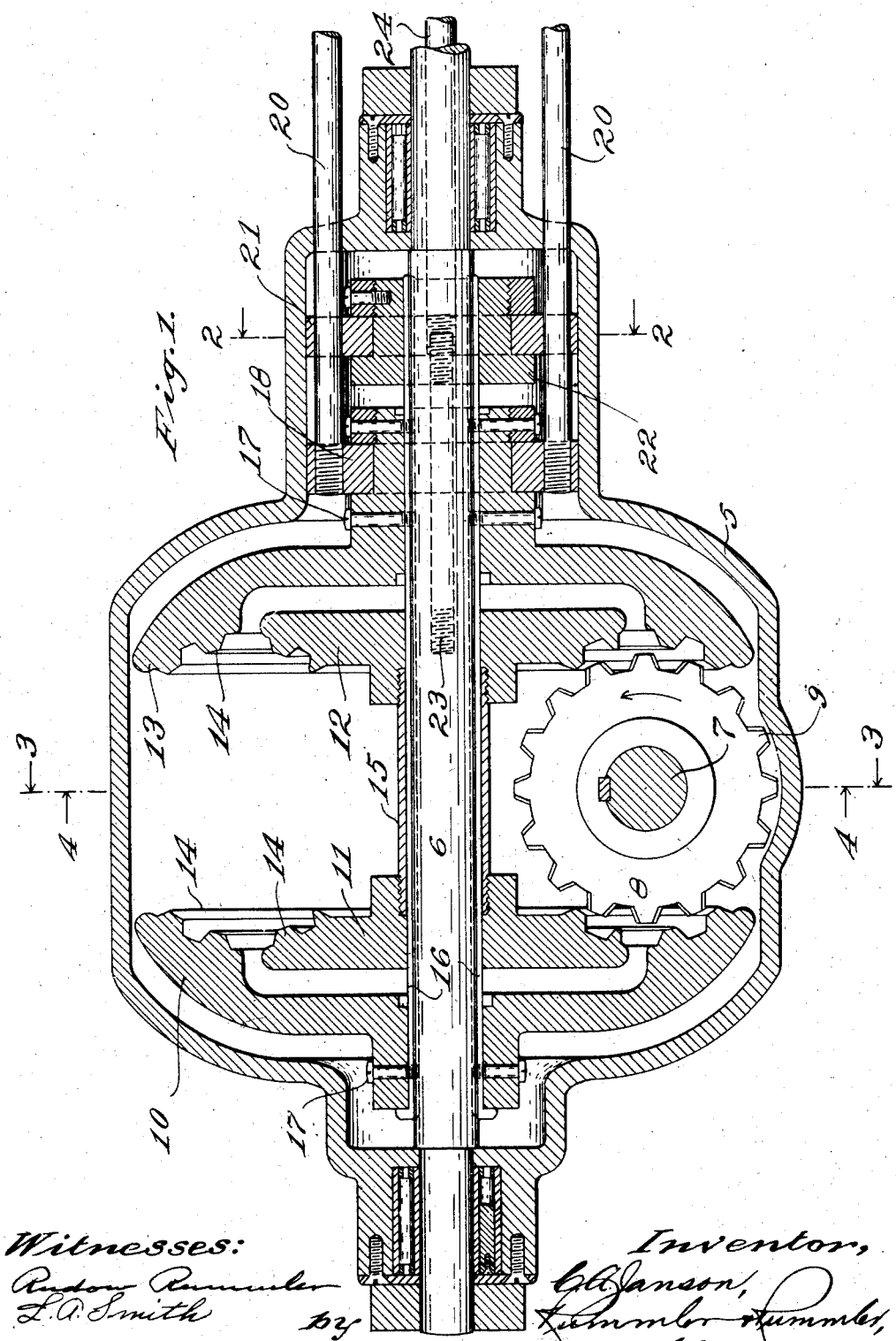

No. 864,845. PATENTED SEPT. 3, 1907.
C. A. JANSON.
VARIABLE SPEED TRANSMISSION MECHANISM.
APPLICATION FILED NOV. 23, 1906.
3 SHEETS—SHEET 2.
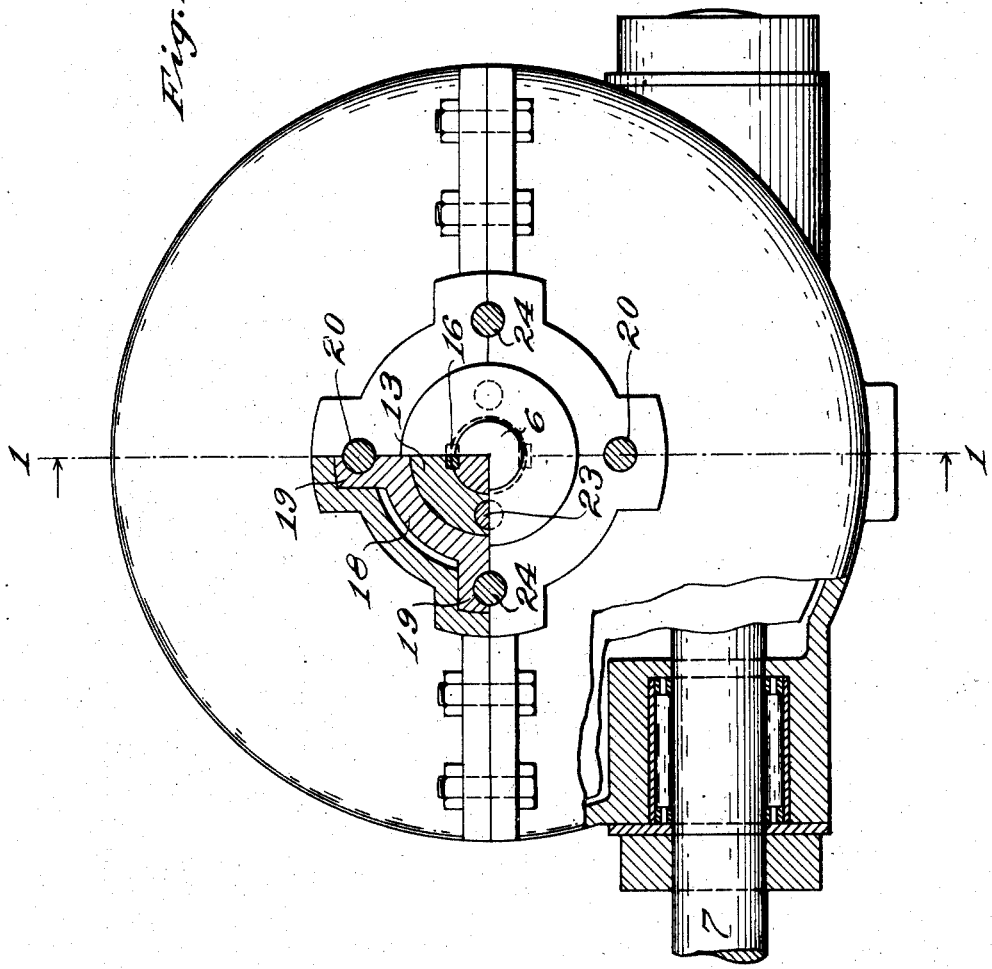

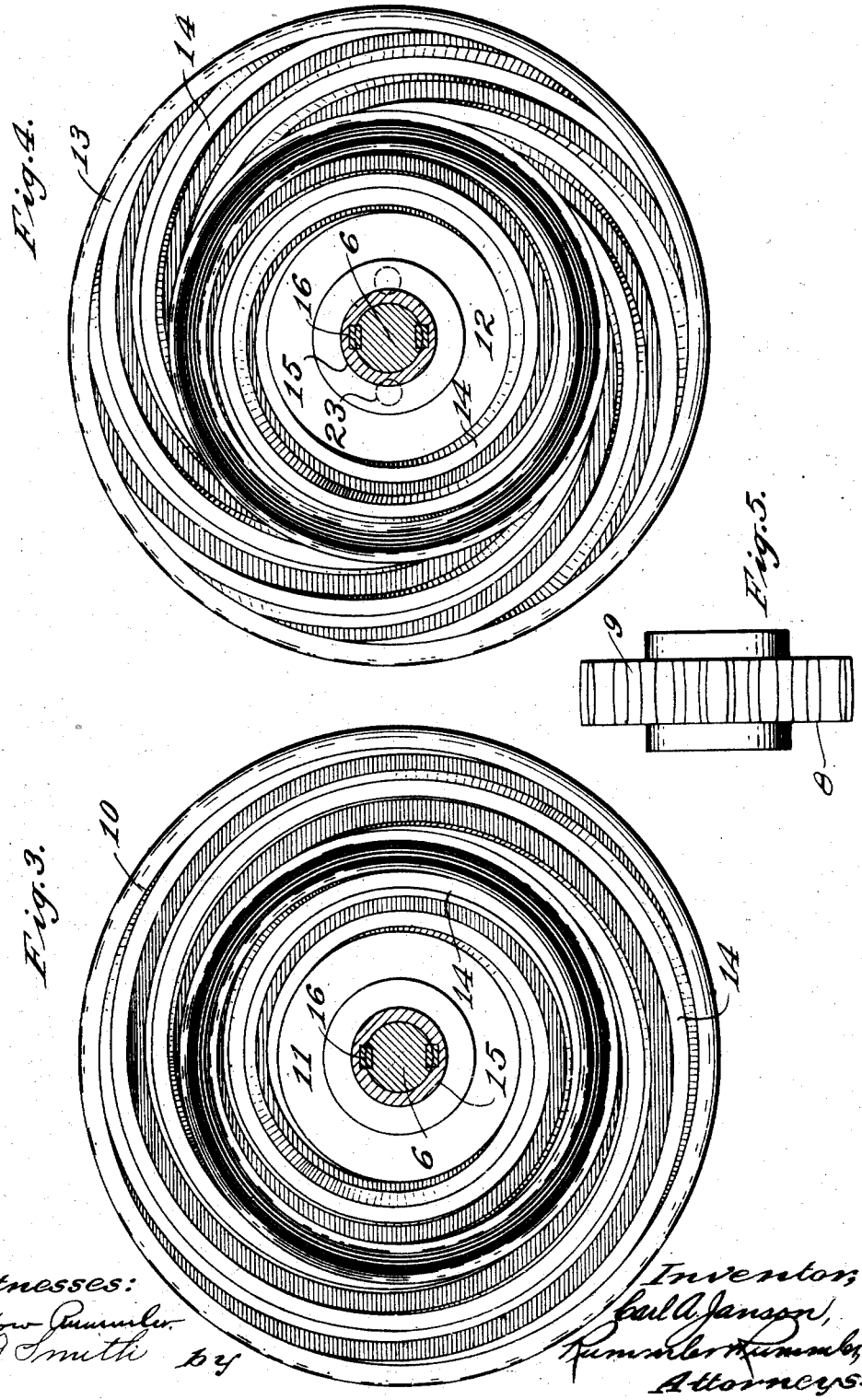

UNITED STATES PATENT OFFICE.

CARL AUGUST JANSON, OF CHICAGO, ILLINOIS.

VARIABLE-SPEED-TRANSMISSION MECHANISM.

No. 864,845.　　　　　Specification of Letters Patent.　　　　Patented Sept. 3, 1907.

Application filed November 23, 1906. Serial No. 344,754.

*To all whom it may concern:*

Be it known that I, CARL AUGUST JANSON, a subject of the King of Sweden, and a resident of Chicago, in the county of Cook and State of Illinois, have invented certain new and useful Improvements in Variable-Speed-Transmission Mechanisms, of which the following is a specification.

The main object of this invention is to provide an improved form of variable speed power transmission mechanism which is adapted to transmit power at a plurality of different relative speeds and which is especially suitable for direct application to the driving axle of a motor vehicle.

A further object is to provide an improved form of variable speed spiral gearing which may be compactly arranged and which may be readily set for different speeds in either direction by means of comparatively simple controlling mechanism.

These objects are accomplished by the device shown in the accompanying drawings, in which:

Figure 1 is a longitudinal section in the plane of the driving shaft of a power transmission mechanism constructed according to this invention. Fig. 2 is an elevation of the same viewed from one end of the driving shaft and being partly broken away to show the details of the construction. The line of section 2—2 in Fig. 1 indicates the plane on which was taken the section which is indicated at the left and above the axis of the driving shaft in Fig. 2. Fig. 3 is an inner face view of one pair of the driving members on the driving shaft. Fig. 4 is an inner face view of the opposite pair of driving members. Fig. 5 is a side elevation of the driven member showing the shape of the teeth thereon.

In the construction shown in the drawings, the mechanism is inclosed in a casing 5 which is adapted to prevent the entrance of dust and at the same time hold a quantity of oil so that the working parts of the gears may be run in oil. The driving shaft is indicated at 6 in the drawings and the driven shaft is indicated at 7. These shafts are journaled in the casing at right angles to each other and are nonintersecting. The driven shaft 7 has rigidly mounted thereon a driven member or wheel 8 provided with gear teeth 9 of peculiar construction as indicated in Figs. 1 and 5. The driving shaft 6 has mounted thereon a plurality of annular driving members 10, 11, 12 and 13, each having one face of suitable form to fit the adjacent portion of the periphery of the wheel 8 and each having thereon one or more spiral ridges 14 adapted to mesh with the teeth on said wheel. All of these driving members are splined to the shaft 6.

The ridges 14 fit the spaces between the teeth 9 so as to run therein without backlash. Each ridge 14 is of the same cross section throughout, but the inclination of its sides is different at different points so as to follow the teeth of the wheel during its rotation and produce a purely sliding motion. The ridges 14 on different driving members are of different pitch so that each imparts a different relative speed to the driven shaft 7. The spaces between the teeth 9 are flared toward each side of the wheel so as to allow for the difference in curvature of the ridges.

The opposed driving members 11 and 12 are rigidly connected together by means of a sleeve 15 and are spaced apart so that only one at a time will be in mesh with the wheel 8. The driving members 13 and 14 are also rigidly connected together, the connection in the device shown being the feathers or splines 16. In this case, said feathers slide in their key-ways and the members 10 and 13 are rigidly secured thereto by the screws 17.

The hub of the member 13 is provided with an annular groove in which is seated a collar 18 which is secured against rotation by means of a plurality of wings 19 which are slidable in suitable guideways in the casing as indicated in Fig. 2. The collar 18 is shifted for bringing either of the driving members 10 and 13 into or out of mesh with the wheel 8 by means of the shift rods 20. A similarly guided collar 21 loosely engages a second collar 22 which is rigidly connected with the driving member 12 by means of the rods 23, and controls the position of the members 11 and 12. The shifting of the collar 21 is accomplished by means of a pair of shift rods 24. The relative position of the shift rods 20 and 24 is indicated in Fig. 2.

The operation of the device shown is as follows: Power is applied to the driving shaft 6 which may be assumed to be continuously driven. If we assume that the spirals on the members 11 and 12 are disposed in different directions, then one of said members will drive the wheel 8 in the opposite direction to that in which it is driven by the other member. In the system shown, the members 10, 11 and 13 all drive the gear 8 in the same direction while the member 12 drives it in the reverse direction. This gives three speeds ahead and one speed reverse without reversing the rotation of the shaft 6. By shifting the rods 24, the wheel 8 may be driven at the speed corresponding to either of the members 11 or 12. Similarly, by shifting the rods 20, the speeds corresponding to either the members 10 or 13 may be had.

What I claim as my invention and desire to secure by Letters Patent is:

1. The combination of a driven member having thereon a series of gear teeth, a driving member journaled near said driven member and having thereon a spiral ridge adapted to mesh with the teeth on said driven member, and a second driving member journaled concentrically of the first driving member and having thereon a plurality of spiral ridges also adapted to mesh with the teeth on said driven member, said members being separately movable into and out of mesh with said driven member.

2. The combination of a wheel having gear teeth on its periphery, a pair of members journaled in axial alinement with each other on an axis transverse to that of the wheel, said members having spiral ridges adapted to mesh with the teeth on said wheel, the ridges on different members being respectively adapted to rotate said wheel at different relative speeds, and mechanism for separately shifting said members into and out of mesh with said gear.

3. The combination of a wheel having gear teeth on its periphery, a shaft journaled on an axis which is at right angles to the axis of said wheel and which lies in the plane of said wheel at one side of its axis, a pair of members mounted on said shaft and movable relatively of each other axially of said shaft, said members having spiral ridges adjacent to the periphery of the wheel and adapted to mesh with the teeth on said wheel, the ridges on different members being respectively of different pitch and being adapted to cause said wheel to rotate at different speeds, and means for shifting either of said members into mesh with said gear.

4. The combination of a wheel having gear teeth on its periphery, a pair of members journaled in axial alinement with each other on an axis transverse to and at one side of the axis of said wheel, said members being located at respectively opposite sides of said wheel and each having thereon a spiral ridge adapted to mesh with the teeth on said wheel, said members being rigidly connected together and spaced apart so that only one at a time may mesh with the teeth on said gear, and means for shifting said members into and out of mesh with the gear.

5. The combination of a wheel having gear teeth on its periphery, a shaft journaled on an axis at right angles to said wheel and lying in the same plane therewith and at one side of the axis thereof, said shaft having thereon a plurality of members located at the same side of said gear in axial alinement with each other and having spiral ridges adapted to mesh with the teeth on said wheel, the ridges on different members being respectively different and adapted to drive said wheel at different relative speeds.

6. The combination of a wheel having gear teeth on its periphery, a shaft journaled on an axis disposed at right angles to the axis of said wheel and at one side thereof, two pairs of driving members mounted on said shaft and located at respectively opposite sides of said wheel, each of said driving members being respectively connected with one of the driving members at the opposite side of said wheel, said members having spiral ridges adapted to mesh with the teeth on said wheel, each connected pair of said members being adapted to be shifted with respect to the other pair, and means for shifting either of said members into and out of mesh with said gear.

7. The combination of a wheel having gear teeth on its periphery, a shaft journaled on an axis which is at right angles to the axis of said wheel and which lies substantially in the plane of said wheel, a plurality of driving members mounted on said shaft adjacent to said wheel, said members having spiral ridges adapted to mesh with the teeth on said wheel for rotating the same through the rotation of said shaft, each of said members being secured against rotation relatively of said shaft and being adapted to be shifted longitudinally of the axis of said driving shaft into and out of mesh with the teeth on said wheel, and means for shifting each of said members into and out of mesh with said wheel.

8. The combination of a wheel having gear teeth on its periphery, a member journaled on an axis transverse to that of the wheel and having thereon a spiral ridge adapted to mesh with the teeth on the wheel, and a second member arranged concentrically of the first member and having a plurality of spiral ridges also adapted to mesh with the teeth on the wheel, said members being separately movable into and out of mesh with the wheel.

Signed at Chicago this 20th day of November 1906.

CARL AUGUST JANSON.

Witnesses:
WM. R. RUMMLER,
E. A. RUMMLER.